Feb. 28, 1933.  H. C. BATES  1,899,451
GLASS COFFEE POT
Filed Oct. 8, 1931
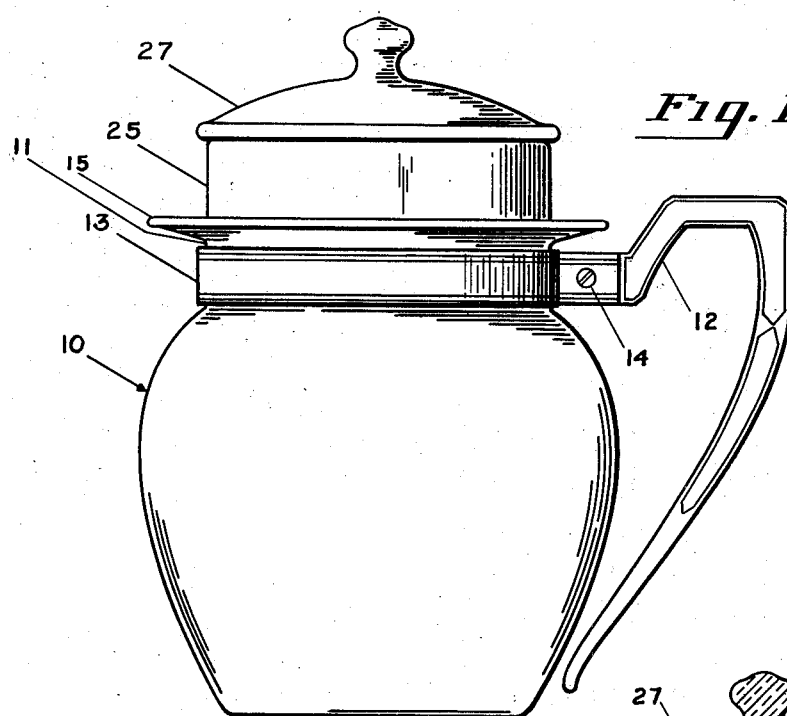
*Fig. 1.*
*Fig. 3.*
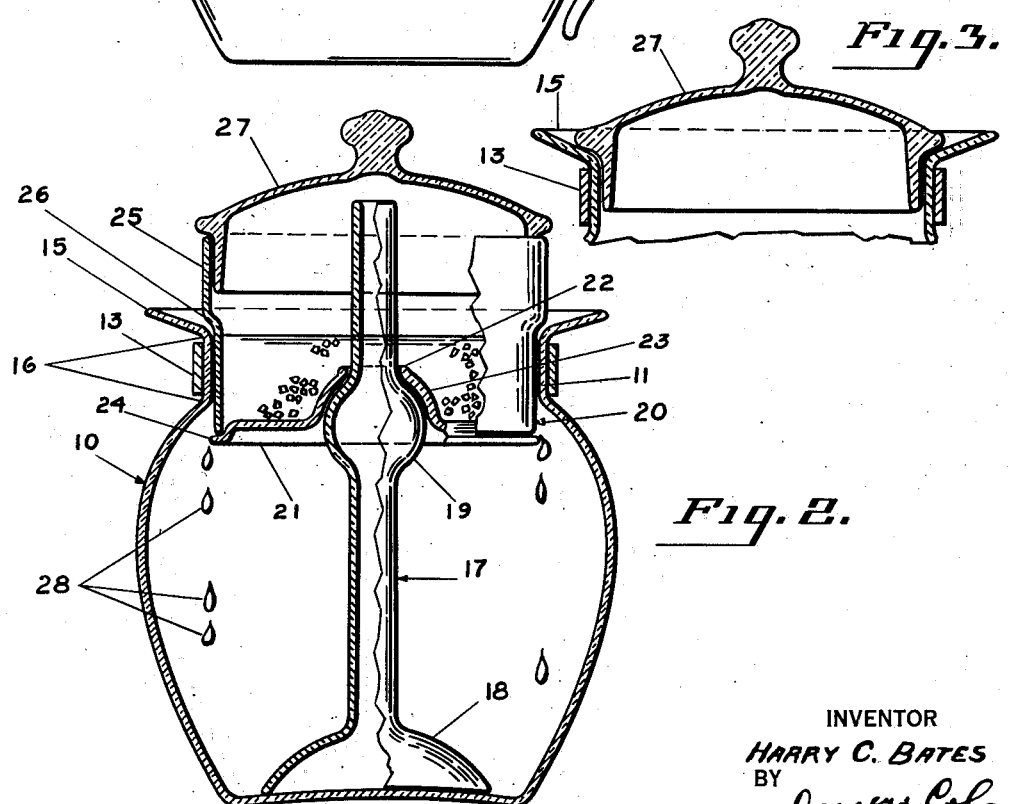
*Fig. 2.*
INVENTOR
HARRY C. BATES
BY
Dorsey + Cole
ATTORNEY Patented Feb. 28, 1933

1,899,451

UNITED STATES PATENT OFFICE

HARRY CLIFFORD BATES, OF CORNING, NEW YORK, ASSIGNOR TO CORNING GLASS WORKS, OF CORNING, NEW YORK, A CORPORATION OF NEW YORK

GLASS COFFEE POT

Application filed October 8, 1931. Serial No. 567,716.

This invention relates to coffee makers and more particularly to a coffee maker made entirely of glass.

Glass is recognized as an ideal material from which to fabricate culinary ware and it is particularly suited for those types of culinary ware such as coffee pots in which cleanliness is the primary requisite. Glass being non-absorbent and insoluble is more readily cleansed than metal and has no tendency to taint the coffee. Prior glass coffee makers although constituting a distinct advance in the art have been of complicated construction or have involved numerous hand operations and hence have been expensive to manufacture as well as being hard to cleanse and sterilize. Furthermore, prior coffee makers possess spouts which allow the decoction contained therein to come in contact with the outside air whereby some of the valuable aroma of the coffee may be lost.

The object of this invention is to produce coffee decoctions which contain the entire aroma of the coffee.

A feature of this invention is a coffee maker which is completely sealed against external air.

Another feature is an all-glass coffee container of simple construction which is easy and economical to manufacture and convenient to clean and sterilize.

My invention further resides in the novel construction, combination, and arrangement of parts to be more fully described herein, claimed in the appended claims, and illustrated in the accompanying drawing, in which:

Fig. 1 is a side view of a complete coffee percolator made in accordance with my invention;

Fig. 2 is a vertical cross-section of the same percolator; and

Fig. 3 is a vertical cross-section of the neck and top of the same percolator with the coffee container removed.

Referring to the drawing, it will be seen that my coffee maker comprises a glass pot 10 having a reduced neck 11 and provided with a handle 12 which may be composed of wood or metal, shaped in any suitable design, and which is attached to the pot 10 by means of a metal clamp or band 13 drawn around the neck of the pot and fastened to the handle 12 by means of a screw 14. The pot 10 is further provided with a flared lip 15 extending around its neck and outwardly beyond the periphery of the band 13. The neck 11 is formed with rounded shoulders 16 having no sharp corners to chip off nor crevices to collect dirt. A glass fountain tube 17 having at one end a flare 18 and intermediate of its ends a spherical out-blown bulb 19 is provided, and when in position in the pot, the tube rests on the bottom of the pot 10 so that its upper end passes through and supports a cylindrical glass coffee container 20, it being understood that the latter is seated upon the bulb 19.

The container 20 in which the ground coffee is to be placed and to which, for convenience, I shall hereinafter refer as the coffee basket is a distinct departure from the usual design in that it consists of only two parts having smooth unbroken surfaces and no inaccessible holes or crevices in which contaminating matter can lodge. One part consists of a glass plate or disk 21 having a centrally located hole 22 through which projects the upper end of the fountain tube 17 and an upwardly turned hemispherical shoulder 23 which rests upon and conforms to the shape of the bulbous portion 19 of the fountain tube 17. The disk 21 is further preferably provided with a downwardly and outwardly turned peripheral flange 24 to form a seat for a cylinder 25 which constitutes the second part of the coffee basket. The corners of the flange 24 are rounded so as to form a close seat for the cylinder 25 and to provide no inaccessible crevices. The lower portion of the cylinder 25 has an outer diameter slightly less than the inside diameter of the neck of the pot 10 and the upper portion has an inside diameter approximately equal to that of the neck of the pot 10. The resulting difference in the outside diameters of the opposite ends of the cylinder results in a circumferential shoulder 26 which is in close proximity to, but does not quite rest upon the neck of the pot 10. The upper portion of the cylinder 25 supports a glass cover 27 which also may be fitted into the neck of the pot 10 when the coffee basket 20 is removed, as is shown in Fig. 3. It is obvious that the flange 24 may be omitted and the cylinder seated directly on the disk 21 near its periphery but I prefer to use the flange as it facilitates the proper location of the parts during assembly.

The operation of my percolator is as follows. In the pot 10, I place the desired amount of water and then assemble therein the fountain tube 17, the disk 21, and the cylinder 25, as shown in Fig. 2. In the coffee basket 20 I place the proper amount of coffee and cover the cylinder with the cover 27, as shown in Figs. 1 and 2. I then heat the water in the pot to boiling whereupon steam forming beneath the flared bottom 18 of the fountain tube 17 lifts the hot water contained therein and projects it against the cover 27 in the manner known for this type of percolator. The water thus discharged from the fountain tube falls back upon the coffee in the coffee basket 20 and filters through to the disk 21 where it seeps out between the lower edge of the cylinder 25 and the flange 24 of the disk 21 to drip back into the pot 10 as shown by drops 28 in Fig. 2. If the boiling is sufficiently vigorous the water may accumulate in the coffee basket 20 so as to rise above the shoulder 23 of the disk 21 and seep through the hole 22 around the fountain tube 17. Condensation collecting between the circumferential shoulder 26 and the lip 15 provides a seal between the coffee basket 20 and the pot 10. The same action serves to seal the cover 27 with the upper end of the cylinder 25.

When the decoction is of the desired strength as may readily be observed through the walls of the glass pot, the pot is taken from the source of heat, the cover is removed and the entire percolator assembly is lifted out by grasping the upper end of the fountain tube 17. The cover 27 may then be placed in the neck of the pot 10, as shown in Fig. 3, until the coffee is to be served, at which time it is again removed and the coffee is poured from the lip 15 provided for that purpose.

It will be seen that a coffee basket such as I have described is of very simple construction in that it may be either pressed or blown and requires very few steps in its manufacture. Furthermore, it can very easily be cleansed of the stains that may tend to accumulate in service since it has no small inaccessible holes or grooves in which such stains can accumulate.

Whereas I have shown and described the embodiment of my invention in a coffee maker of the type known as a coffee percolator, it is to be understood that I do not wish to be restricted thereto except as defined in the appended claims and that by slight alteration my percolator can be altered into a device for making drip coffee without departing from the spirit and scope of the invention as claimed.

What I claim is:

1. In an all glass coffee percolator a glass coffee basket comprising a circular plate having a centrally located hole, a peripheral flange extending downwardly and outwardly from the edge of said plate and a cylinder seated on the flange in spaced concentric relation to the hole in the plate.

2. In an all glass coffee percolator a glass coffee basket comprising a circular plate having a centrally located hole surrounded by an upwardly-extending hemispherical depression, a peripheral flange extending downwardly and outwardly with rounded corners from the edge of said plate and a cylinder seated on the flange in spaced concentric relation to the hole in the plate.

3. In an all glass coffee percolator a glass coffee basket comprising a circular plate having a centrally located hole surrounded by an upwardly-extending hemispherical depression, a peripheral flange extending downwardly and outwardly with rounded corners from the edge of said plate and a cylinder seated on the flange in spaced concentric relation to the hole in the plate, the upper end of said cylinder having a larger diameter than the bottom end thereof with a rounded shoulder approximately midway of its length to compensate the difference in the diameters of the ends.

HARRY CLIFFORD BATES.